United States Patent [19]
Schweppe et al.

[11] 3,809,120
[45] May 7, 1974

[54] RAMDOM SEQUENCED PNEUMATIC MULTIPLEXING VALVE APPARATUS

[75] Inventors: Joseph L. Schweppe; Arthur H. McMorris; Erick L. Ahlgren, all of Houston, Tex.

[73] Assignee: Houston Engineering Research Corporation, Houston, Tex.

[22] Filed: Sept. 21, 1971

[21] Appl. No.: 182,478

[52] U.S. Cl.............. 137/607, 137/552.5, 137/609, 251/7
[51] Int. Cl............................................. F16k 19/00
[58] Field of Search............ 137/606, 607, 608, 609, 137/594, 597, 552.5, 595; 235/200 R, 201 ME, 201 PF

[56] References Cited
UNITED STATES PATENTS

| | | | |
|---|---|---|---|
| 2,751,933 | 6/1956 | Urteaga | 137/595 X |
| 3,468,342 | 9/1969 | Craft | 137/597 X |
| 3,450,157 | 6/1969 | Hewson | 137/595 |

*Primary Examiner*—Robert G. Nilson
*Attorney, Agent, or Firm*—Donald Gunn

[57] ABSTRACT

For multiplexing a number of pneumatic signals in random sequence, an apparatus which incorporates a plurality of gang operated valves arranged in a two dimensional pattern wherein the apparatus includes a body with two groups of valve operators extending therethrough, preferably at right angles. Each individual valve operator is preferably connected to several valves. However, the operation of two valve operators is required to open a single pressure source to the outlet so that the pressure to be scanned is identified by the coordinates of its location in the two dimensional pattern.

22 Claims, 9 Drawing Figures

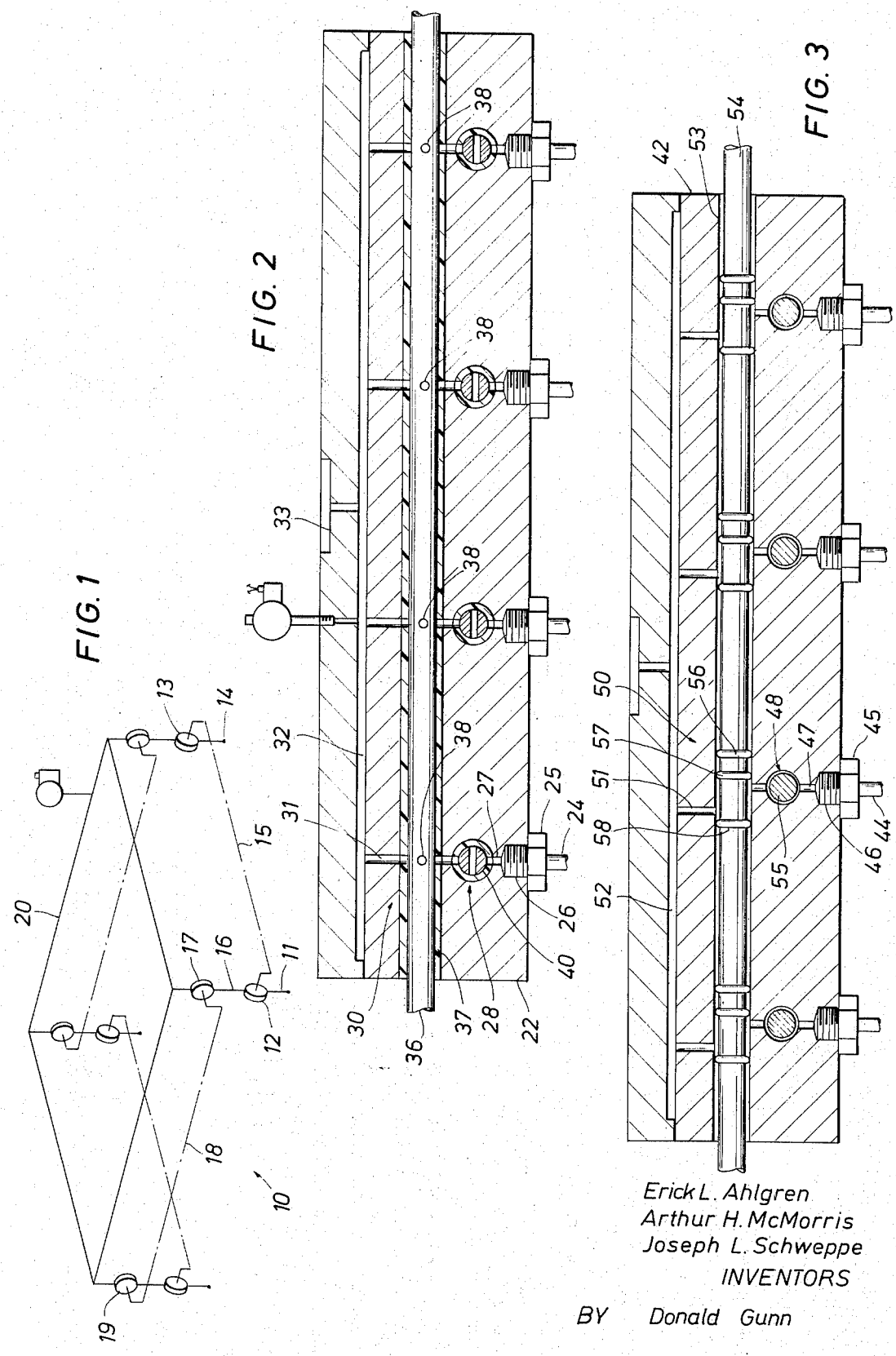
Erick L. Ahlgren
Arthur H. McMorris
Joseph L. Schweppe
INVENTORS
BY  Donald Gunn
ATTORNEY

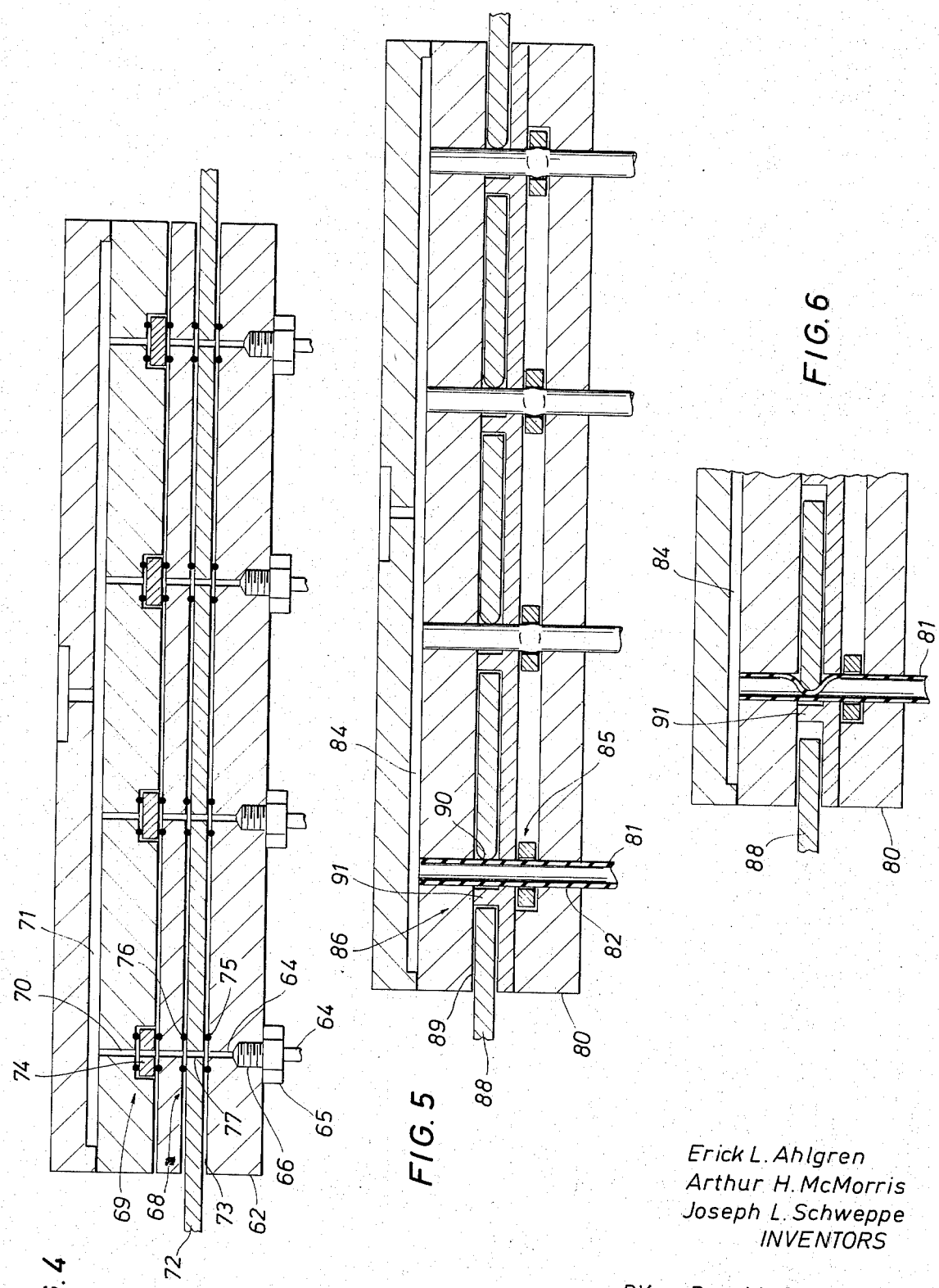

PATENTED MAY 7 1974　　　3,809,120

Erick L. Ahlgren
Arthur H. McMorris
Joseph L. Schweppe
INVENTORS
BY Donald Gunn

ATTORNEY

RAMDOM SEQUENCED PNEUMATIC MULTIPLEXING VALVE APPARATUS

RELATED APPLICATIONS

Applicant has no presently pending related applications.

SUMMARY OF PROBLEM AND SOLUTION

In some circumstances, it is necessary to scan a number of pneumatic pressure sources. By way of example, in process control equipment it is necessary to convert the pressure of a number of sources to an electrical signal. In present day installations, the pneumatic pressure sources are scanned in sequence. The time lag is measurable. In the typical rotary sequential scanning valve presently on the market, a substantially long period is required before reaching the pneumatic signal desired unless it should be the pneumatic signal immediately following the one previously scanned. In a sequential scanning valve of this nature, many signals are scanned, but very few are needed. Many signals are input, but perhaps not all are used. Of course, the adaptation of a single valve and single actuator for each signal source is unduly extravagant, and likewise has substantial time lag inasmuch as the common manifold is exceedingly voluminous.

The foregoing sets forth certain problems found in devices presently available. By way of contrast, the present invention is readily summarized as providing a scanning valve which operates in a non-sequential manner with a recurring time lag between each operation whereby pressure from many sources is scanned quite readily. The device includes a body having a plurality of inlet connections for a large number of pressure sources to be scanned, the inlets being arranged in a regular grid pattern. Individual valve operators are arranged at right angles utilizing the regular grid pattern. A single inlet is scanned by enabling valve operators in the X and Y dimensions of the grid pattern such that scanning is achieved on the coincidence of two signals. It will be appreciated that the number of actuators is far less than the number of inlets to be scanned.

Many objects and advantages of the present invention will become more readily apparent from a consideration of the following specification and drawings, which are:

FIG. 1 is a schematic drawing of the grid pattern utilized in organizing a number of pneumatic pressures to be scanned through the use of the present invention;

FIG. 2 is a sectional view through a first embodiment of the present invention utilizing a rotary valve operator;

FIG. 3 is a sectional view through a second embodiment of the present invention utilizing a cylindrical but slidable valve operator;

FIG. 4 is a sectional view taken through a third alternative embodiment of the present invention utilizing rectangular slide bars as the operators;

FIG. 5 is a sectional view through a fourth embodiment of the present invention utilizing rectangular slide bars as valve operators;

FIG. 6 is a portion of FIG. 5 showing a slide bar in operation wherein the passage is pinched closed to close or open the valve thereof;

Figure 7:
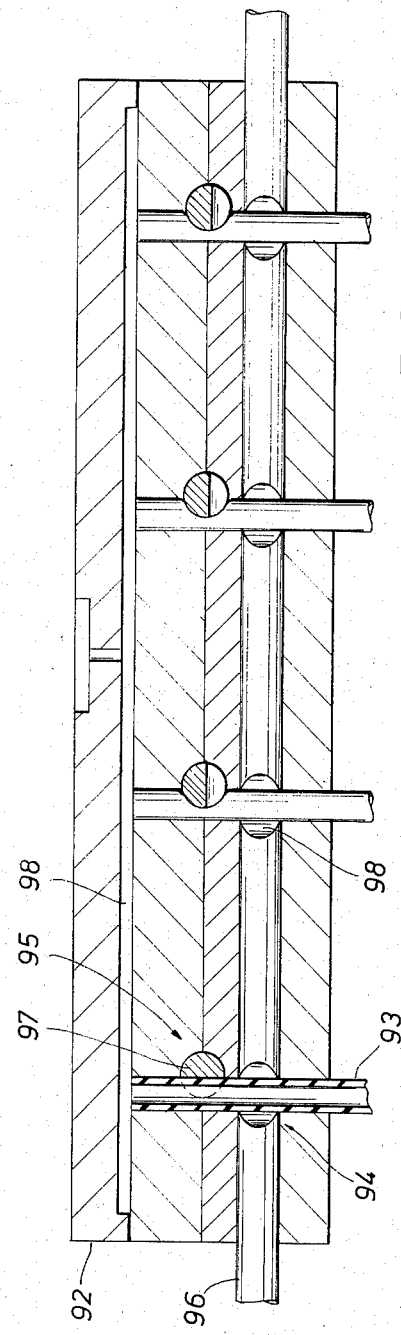
FIG. 7 is a sectional view taken through a fifth embodiment of the present invention illustrating a rotatable round valve operator.

In the drawings, attention is first directed to FIG. 1 which is a three dimensional schematic of the invention which is indicated by the numeral 10. The non-sequential multiplexing valve of FIG. 1 will be described with only four pressure inlets to be scanned, it being appreciated that the principal of FIG. 1 can be applied to greater numbers of pressures to be scanned. The numeral 11 indicates an inlet port which is communicated by a first valve 12. The valve 12 is ganged with a similar valve 13 for a second pressure inlet port 14. A common mechanical operator is indicated schematically at 15. In other words, the valves 12 and 13 are operated by the common operator 15. The outlet of the valve 12 is connected by a line 16 to an additional valve 17. The valve 17 is operated by a valve operator 18. The valve operator 18 likewise operates an additional valve 19. It will be noted that the valves 17 and 19 are arranged on a different plane from the valves 12 and 13. The single inlet 11 cannot be scanned until two valves have been opened. The operation of a single valve does not permit the scanning of the connected pressure source. The two planes of valves are organized into ranks and files and the valve operators 15 and 18 are arranged in the respective ranks and files of the two separate planes. The lower plane includes a number of valves which are all connected by parallel valve operators. The upper plane includes a number of valves which are likewise connected to parallel valve operators. However, the two sets of valve operators are arranged at right angles. This organizes the number of inlets with four, or far greater than this number, so that a particular inlet can be scanned by operating only two valve operators, one in each plane, so that the individual valves at the particular point to be scanned are both opened. This condition occurs uniquely only at one location in the entirety of the multiplexing valve 10.

The numeral 20 indicates an output manifold which is common to all the valves in the top plane, including the valves 17 and 19. The manifold 20 can be readily connected to a pressure converter or some other cooperative equipment. The significant point is that of all the inlets provided to the multiplexing apparatus 10, only one is communicated all the way through the two levels of valves to the outlet manifold 20. This enables non-sequential scanning. It will be further appreciated that the location of a particular valve is indicated by an X - Y coordinate designation. For instance, if one hundred inlets are provided, the location of a particular valve can be designated just as easily as for the four inlet arrangement of FIG. 1.

After having considered the operation of the invention in general concept, attention is next directed to FIG. 2 of the drawings. In FIG. 2, the apparatus is shown in greater detail. There are five embodiments found in the drawings, and each of the five structures will be separately described.

In FIG. 2, the numeral 22 indicates a valve body. In the preferred embodiment of all five versions, the valve body is preferably a rectangular block which can be built of a single piece of metal or by assembling several pieces of metal one on the other with appropriate gaskets and head bolts at spaced locations thereabout. The numeral 22 indicates the valve body. The numeral 24 identifies a pressure line which is joined by a fitting 25 to a tapped opening 26. The pressure line 24 may extend only a few inches, or may extend several hundred feet to communicate a source of variable pressure. This is the inlet which is to be scanned. In many process control situations, the pressure will range between roughly 3 to 15 PSI. In pneumatic control systems, this is the common range used. The line 24 is connected with the pressure source.

The tapped opening 26 communicates upward through a passage 27. The passage 27 intersects a first valve which is indicated by the numeral 28. The first valve 28 is like an additional valve 30 thereabove. The valve 30 is at right angles with the valve 28. It will be understood that a description of the valve 28 suffices for the valve 30.

The passage 27 is therefore communicated through the valves 28 and 30 to an additional passage 31. The passage 31 then connects with a common manifold 32. The manifold 32 is common to all of the pressure sources to be scanned, but each connection is made through a pair of serially arranged valves in like manner to those previously described. An outlet for the manifold 32 is formed at 33 and is suitably positioned and located for connection with a pressure measuring device of some form or fashion.

Returning to the valve 30, it should be noted that a common rotatable operator rod is found at 36. The rod 36 is received within a drilled opening in the valve body 22. The opening is lined with a resilient material indicated at 37. The material 37 seals against the rod 36. The rod 36 has an opening 38 and preferably has two positions. One is when the passage 38, approximately perpendicular to the axis of the rod, is positioned perpendicular to the passage 31. This indicates that the valve 30 is closed. The opening 38 is repeated at spaced locations along the length of the round operator rod 36. The operator rod controls the operative state of the several valves. When it is in the posture of FIG. 2, all the valves are closed. When it is rotated ninety degrees, all the valves which are common to the rod 36 are open. Manipulation of the rod 36 to operate one valve opens a plurality of valves. However, for reasons to be noted hereinafter, even though many valves are open, only one pressure source is scanned by the multiplexing valve 10 of the present invention.

Considering only the pressure inlet 24, it is therefore multiplexed if, and only if, the necessary operative position is achieved by the valve operators 36 and 40. The valve operator 40 need not be explained in the same detail devoted to the operator 36 inasmuch as the operator 40 is similar in all regards except its physical arrangement. As shown in FIG. 2, it is perpendicular to the operator 36. It opens and closes a different set of valves from that of the operator 36. The two valve operators are located in different planes. The valve operator 36 in the upper plane is identical to a number of similar operators in the upper plane. FIG. 2 also shows a number of additional valve operators parallel to the operator 40 which are similar or identical. The several valve operators define a rectangular grid pattern which is arranged so that each pressure inlet is connected through a valve in the lower plane and then a valve in the upper plane to the outlet manifold 32.

In the closed position, each of the valves of FIG. 2 prevents communication because the resilient material which surrounds the operator seals against the operator.

Attention is next directed to FIG. 3 of the drawings where a valve body is indicated by the numeral 42. The numeral 44 indicates a pressure conductive line which is adapted to be connected with a remote source of variable pressure. The line 44 is connected to a fitting 45 which is received in a tapped opening 46. The tapped opening communicates to a passage 47 which connects with a valve 48. The valve 48 is located on the lower plane of the valve body 42, there being an additional valve 50 found on the upper plane. The valve 50 then communicates with an additional passage 51 which then connects with an outlet manifold 52. The manifold 52 is similar to the manifold 32 found in FIG. 2. It is common to all the pressure inputs. Each pressure input must be communicated through two valves arranged in series before the signal of a particular pressure input is communicated to the output manifold 52.

A cylindrical but slidable valve operator rod 54 is shown in FIG. 3. A similar valve operator rod 55 is arranged in the lower plane and is perpendicular. The valve operator rod 55 causes the valve 48 to operate to the closed or open position. The slidable rod 54 likewise causes the upper valve 50 to operate. A description of the rod 54 and the valve 50 should suffice for an understanding of the embodiment of FIG. 3. The rod 54 is received within a machined passage 53. The operator rod 54 does not rest against the side wall of the passage 53. Rather, the operating rod 54 carries a number of seal rings indicated by the numerals 56, 57, and 58. The spacing between the seal rings 56, 57 and 58 should be noted. In the position of FIG. 3, the valve operator rod 54 has positioned the seal rings 58 and 57 to permit communication between the passage 51 and the valve 48 therebelow. Communications up or downstream along the passage 55 is forbidden by the seal rings 57 and 58. However, the valve 50 is in the open position because the valve 48 therebelow is connected with the passage 51. The other operative state of the valve 50 is achieved when the cylindrical rod 50 is moved to the left so that the seal ring 57 is positioned to the left of the valve 48. This then leaves the seal ring 56 downstream while the seal ring 58 is put substantially upstream to prevent leakage along the operator rod. The seal ring 57 is interposed between the passage 51 and the connection to the valve 48. The location of the seal ring between these two points closes communication, and hence, the valve 50 may be said to be closed. When this is achieved, the valve is closed, which event is common to all of the valves arranged along the length of the valve operator rod 54.

From the foregoing, it will be understood how the valve 48 also operates. The two valves are controlled by the operator rods which are reciprocated to and fro in the passages in which they are positioned. This is the technique used to enable connection of any particular pressure inlet connected with a valve body 42 to the outlet manifold 52 shown in the drawings. It will be appreciated that in common with the structure of FIG. 2, each inlet is enabled when coincident operation of two valves, one found in the upper plane, and the other found in the lower plane, is achieved in accordance with the X - Y grid pattern teachings of the present invention.

Going to FIG. 4 of the drawings, the numeral 62 indicates a valve body which is similar to the valve bodies 42 and 22 shown in previous figures. The numeral 64 indicates a particular pressure conduit which is connected by means of a fitting 65 to a tapped opening 66. The tapped opening communicates with an upwardly directed passage 67. The numeral 68 indicates a first valve connected with the passage 67 while the numeral 69 indicates a second valve. The second valve is connected by a passage 70 to a common outlet manifold 71. The same general order or arrangement as found in FIGS. 2 and 3 is shown in FIG. 4. The valve 68 is made dependent on the position of a valve operator rod 72. A similar valve operator rod 74 passes through the valve 69. The valve operator rod 72 is a rectangular rod having planar upper and lower faces which are parallel to one another. The valve operator 72 is received within a passage 73 extending through the valve body 62. The passage 67 intersects the passage 73. The intersection is sealed by an O-ring 75. A similar O-ring 76 is located on the top of the operating rod 72. The top and lower faces are sealed so that communication from the passage 67 and through the valve 68 can be achieved without leakage along in the passage 73.

It will be noted that the valve 69 likewise includes O-rings on the upper and lower faces of the operating rod 74. The seal rings are recessed into the sidewalls of the valve body 62. Thus, they stay in position even when the slide bars 72 and 74 move.

The valve 68 is rendered operative when a small passage indicated by the numeral 77 is aligned with the passage 67. Thus, communication is achieved and the valve can be said to be open. The same is true of the upper valve 69. It is operative when the perpendicular passage through the slide bar 74 is positioned in line with the passage 70 in the valve body. It will be noted upon viewing the operator rod 72 that a number of transversely extending passages are located along its length. The rod 72 opens a plurality of valves simultaneously. A particular pressure inlet is not communicated with the output manifold 71 until a valve in the lower plane is operated coincident with operation of the valve in the upper plane. In both cases, the operator rods are rectangular slide bars which are reciprocated to the operative positions to open the valves. Reciprocation to move the passage 77 to a point outside the seal rings 75 and 76 closes the valve. The open and closed position is achieved in the same manner for both valves 68 and 69.

Attention is next directed to FIG. 5 of the drawings. In FIG. 5, the numeral 80 identifies a valve body. The numeral 81 identifies a conduit which is adapted to be communicated with a particular pressure source. The conduit is received within an opening 82 in the valve body 80. The conduit, however, is formed of a resilient material and extends all the way through the valve body to the outlet manifold 84. It will be noted that the resilient tubing 81 passes through a first valve 85 and a second valve 86. These valves are quite similar in operation, and differ in that they are located in two planes, an upper and lower plane. Each has a slide bar operator, the upper slide bar operator being indicated by the numeral 88. The slide bar 88 is received within a passage 89. It is preferably rectangular in cross section along a substantial portion of its length. It is relatively narrow along its length up to the laterally projecting shoulder 90. The shoulder 90 is positioned against one side of the resilient tubing 81. The opposite side of the tubing is adjacent to a fixed insert 91. The insert 91 approximates the tubing member 81 in width so that the slide bar 88 passes on the far side of the insert 91 as viewed in FIG. 5 of the drawings. The slide bar 88 is thus relatively narrow, but is wider at the shoulder 90 so that the shoulder protrudes on one side of the tubing 81 so as to pinch the tubing against the insert 91. This is better shown at FIG. 6 of the drawings.

In FIG. 6, the slide bar 88 is moved to the left and the shoulder 90 has pinched the tubing shut against the insert 91. When this is accomplished, the valve is closed.

It will be appreciated that the valve 85 functions in the same manner as the valve 86. The two valves are operated by operating rods having sliding motion which are arranged in a rectangular pattern in separate planes. This is consistent with the embodiments previously described and discussed.

The tubing 81 communicates directly with the output manifold 84. The tubing provides integrity of communication so that no external seals or O-rings are required, as in some of the other embodiments.

Attention is next directed to FIG. 7 where the numeral 92 identifies a valve body in which a tubing member 93 is extended to an outlet manifold 98. In this regard, the tubing member more nearly resembles the tubing member of FIGS. 5 and 6 as opposed to some of the other embodiments. The tubing member 93 is formed of resilient material and is received within an opening extending to the manifold 98 so that pressure is communicated to the outlet manifold. The tubing 93 passes through and is cooperative with a narrow valve indicated generally by the numerals 94 and 95. The valves 94 and 95 are arranged in two planes, and both must be open to permit communication to the outlet manifold 98.

The valve 94 is rendered operative by means of an operating rod 96. By way of contrast, the valve 95 is rendered operative by a rod 97. The operating rods 96 and 97 are identical, except for their arrangement in the valve body 92. A plurality of operating rods is arranged in two planes, the two groups of rods being perpendicular to one another in the manner previously described. Each rod has a cut away portion best indicated at 98 which defines a relatively flat face adapted to be contacted against the side wall of the tubing member 93. The cut away portion is adjacent to the tubing. It will be noted that the sectional view of the valve 95 in FIG. 7 shows the flat face in contact with the tubing but not deforming the tubing so that the full internal diameter of the resilient tubing is maintained. The lower operating rod 96 likewise achieves this arrangement, but it is not shown so clearly. The cut away portions are better shown on the lower rod 96. The rod 96 is actuated by rotation, not by sliding movement. Rotation of approximately 90° forces the tubing shut. The tubing is pinched, so to speak, in the manner such that the tubing is closed by the pressure on the shoulder bearing against it. The edge of the shoulder at the periphery of the tube actually contracts and closes the tubing.

The cylindrical operator rods 96 and 97 are received within cylindrical passages which intersect the passage for receiving the tube 93. The intersection is somewhat off center. The axes of the passages are somewhat off center as best shown in FIG. 7 of the drawings. The offset permits the operator rod to create the pinching movement which tends to close the resilient tubing member 93.

Leakage is prevented because the tubing member 93 is integral through the valve body until it makes the connection with the outlet manifold 98. The manifold 98 is common to all pressure sources input to the non-sequential multiplexing valve of FIG. 7.

Figure 8:
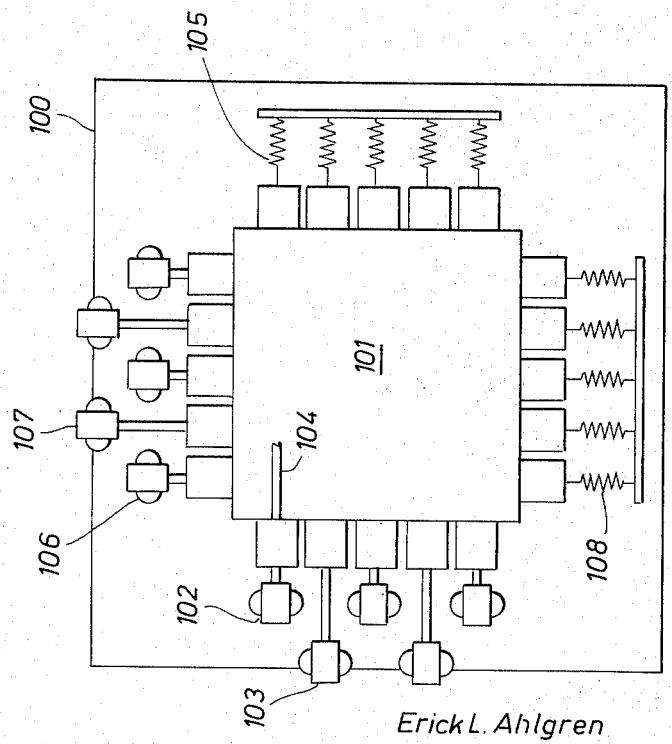
FIG. 8 is a top view of a selected size of non-sequential scanning valve in accordance with the present invention illustrating the position of valve operators and return mechanisms therefor; and, FIG. 9 is a top view similar to FIG. 8 illustrating the arrangement of valve operators for rotatable mechanisms as opposed to sliding mechanisms of FIG. 8.

Attention is next directed to FIG. 8 where the numeral 100 identifies a mounting block. The mounting block supports a valve body 101 in a central location. The numeral 102 identifies a first solenoid and the numeral 103 identifies a second solenoid. The solenoids 102 and 103 move appropriate operating rods such as the rod 104 to manipulate valves whereby the non-sequential multiplexing valve can be operated. The solenoids arranged on the left hand side of the mounting plate 100 all cooperate with operating rods which are found in a single plane and which are preferably parallel with one another. The particular rod 104 is operated by the solenoid 102. At the opposite end, a spring 105 returns the operating rod 104 to its original position. The original position is preferably the position at which all the valves along the rod 104 are closed. Thus, when a signal is applied to the solenoid 102, all the valves operated by the rod 104 are moved to the open position. The same mode of operation is true for the solenoid 103 and the other solenoids located on the left.

Along the upper edge of the mounting plate 100 is situated a plurality of additional solenoids 106 and 107. The solenoids 106 and 107 are connected with additional operating rods which are located in a common plane, but positioned either above or below the plane for the solenoids 102 and 103. Two groups of solenoids are provided, and each group is connected with a plurality of operating rods, the two groups of rods being indicated in parallel planes and spaced from one another. The operating rods connected to the solenoids 106 and 107 pass through a plurality of valves to be operated. The operating rods are connected to return springs indicated by the numeral 108 on the opposite side from the solenoid 106. Each rod is connected to a return spring. The several return springs at 108 return the respective valves along each of the operating rods to the closed position.

FIG. 8 illustrates a means whereby the individual operating rods can be operated. That is, means for providing translational movement are illustrated in FIG. 8. Referring to the earlier drawings, the embodiment of FIG. 3 is such an embodiment where sliding or translational movement is utilized. The structure of FIG. 8 shows the motive means for opening and closing the valves to achieve non-sequential multiplexing. This can be utilized by implementing the slide rods of FIG. 3. FIG. 4 is an embodiment in which sliding movement is achieved. FIG. 4 differs from FIG. 3 in that FIG. 3 utilizes a circular rod while FIG. 4 illustrates a rectangular slide bar. FIG. 5 likewise requires sliding movement. In this regard, it is similar to FIG. 4. It is sufficient to note that the embodiments of FIGS. 3, 4 and 5 can be manipulated using solenoids as the motive means and return springs at the opposite ends in the manner taught by FIG. 8 to achieve operation of those embodiments of the non-sequential scanning valve of the present invention.

Figure 9:
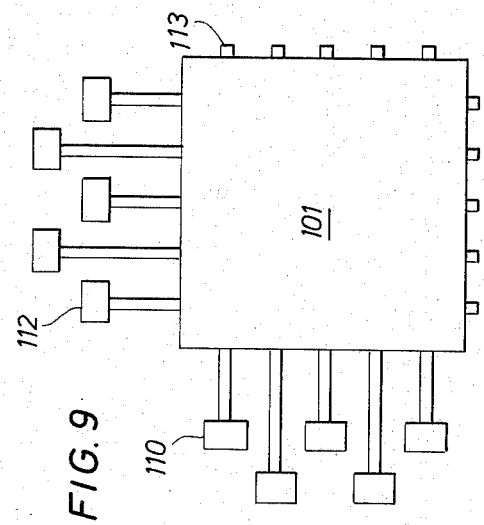

Attention is next directed to FIG. 9 of the drawings. In FIG. 9, rotational operators are indicated at 110 and 112. The arrangement of FIG. 9 is similar to FIG. 8 in that operators are positioned along two sides of the valve body 101. The operators 110 and 112 function in the same manner. They are preferably rotational operators which provide the preferred ninety degrees of rotation. A rotational operator can be either a solenoid working against a return spring, or some other similar structure. The valve operators are arranged in two groups. The motive means 110 and 112 are preferably clustered along perpendicular edges of the valve body 101. The operating rods extend into the body and are received in capped housings at 113 which may include a bearing for ease of rotation.

The X - Y arrangement of valves in two planes in FIG. 9 is similar to that of FIG. 8. However, the rotational motive means 110 and 112 of FIG. 9 best adapts itself for use with the particular valving arrangements shown in FIGS. 2 and 7 of the drawings. Both embodiments of FIGS. 2 and 7 require rotation of approximately 90° to go from the full open to the full closed position.

Several significant modifications in the invention may be incorporated. For example, the manifold 20 shown in FIG. 1 may accumulate pressures dependent on the connected downstream equipment. It may or may not include a means for venting the manifold to atmosphere. Accordingly, an option incorporated in FIGS. 1 and 2 is a bleed valve to atmosphere for venting the manifold to permit the pressure in the manifold to settle on introduction of a pneumatic signal. Preferably, the valve is solenoid operated and vents to atmosphere when the valve operators (see FIGS. 8 and 9) close the valves in the scanning device of the present invention. As a consequence, when a signal is introduced into the manifold, the vent valve is closed, but when no pneumatic signal is provided, the manifold is vented to thereby reduce its pressure.

One further modification of interest is the modification of the rotary operators 110 and 112 in FIG. 9. They can rotate through a right angle. However, for faster operation, full operation of the rotative valves can be achieved with less than full rotation. Thus, the preferred rotation would be that to cause the connected valve to operate. This might be perhaps 45° or 60° of rotation for the embodiments of FIGS. 2 and 7.

In installation, the device might often be installed in an upright posture so that the pneumatic sample lines would emerge from the rear of a panel. This does not alter the operation of the device.

The foregoing is directed to the preferred embodiments of the present invention, and includes five alternative valving arrangements. The scope of the present invention is determined by the claims which are appended hereto.

What is claimed is:
1. A non-sequential multiplexing valve comprising:
a valve body;
an outlet manifold in said valve body;
at least four inlet ports in said valve body all of said inlet ports being connected with said outlet manifold;

a first plurality of valves operatively arranged between said inlet ports and said outlet manifold to selectively and controllably control communication between said inlet ports and said outlet manifold;

a second plurality of valves operatively arranged to selectively and controllably control communication between said inlet ports and said outlet manifold, said first and second pluralities of valves being respectively arranged in series with respect to each of said inlet ports;

a first group of valve operators operatively connected to said first plurality of valves said valve operators including an elongate rod extending from a given inlet port to another inlet port, and a motive means is operatively connected to said elongate rod for moving same;

a second group of valve operators operatively connected to said second plurality of valves; and, said first and second groups of operators being arranged so that a particular inlet port is uniquely communicated with said outlet manifold on manipulation of a single valve operator in said first group and a single valve operator in said second group.

2. The invention of claim 1 wherein said inlet ports are arranged in a rectangular pattern in said valve body.

3. The invention of claim 1 further including within said valve body:
a. a generally vertically extending first passage;
b. a second passage perpendicular to said first passage;
c. a third passage perpendicular to said first passage;
d. seal means arranged in the vicinity of the intersection of said first passage with said second passage;
e. seal means arranged in the vicinity of the intersection of said third passage with said first passage;
f. an operator rod received in said second passage;
g. an operator rod received in said third passage;
h. a generally transversely extending opening in said first operator rod and positioned in line with said first passage;
i. a generally transversely extending opening in said second operator rod and positioned in line with said first passage;
j. means for selectively moving said first operator rod to align said opening therein with said first passage to open a path of communication therethrough and to close a path of communication therethrough;
k. means for selectively moving said second operator rod to align said opening therein with said first passage to open a path of communication therethrough and to close a path of communication therethrough.

4. The invention of claim 3 wherein said first operator rod is rotated in movement.

5. The invention of claim 3 wherein said first operator rod is slidingly moved with respect to said body.

6. The invention of claim 3 wherein:
a. said first operating rod is generally rectangular and has a pair of generally parallel faces;
b. said seal means is received within said valve body at opposing positions and bearing on opposing faces of said first operating rod; and,
c. said opening positioned in said operating rod to move into and out of alignment with said seal means.

7. The invention of claim 1 wherein said valve body includes:
a. first, second and third passages;
b. a first operating rod in said first passage and slidably movable therein;
c. a second operating rod in said third passage and slidably movable therein;
d. seal means carried on said first rod at three points thereon and so spaced that communications to the first passage is selectively controlled by the position of said seal means;
e. seal means carried on said second rod at three points thereon and so spaced that communications to the third passage is selectively controlled by the position of said seal means; and,
f. means for sliding both rods.

8. The invention of claim 1 wherein said valve is further defined
a. said first group of valve operators being parallel to one another and being positioned with respect to said ports such that each of said ports has in near proximity thereto at least one of said valve operators;
b. at least two of said valve operators having a circular portion;
c. said circular portion being received within a surrounding resilient yieldable bearing within said valve body;
d. said resilient bearing closing the outer surface of said circular portion to communication along said valve operator;
e. an opening formed in the circular portion of said valve operator and extending therethrough; and,
f. a passage extending through said valve body and connected with said inlet ports and being further selectively communicated with said opening in said valve operator and further communicated with said outlet manifold to controllably communicate one of said inlet ports with said outlet manifold.

9. The invention of claim 8 further including a second arrangement in said passage similar to that of claim 9, the two being arranged in series controllably opened and closed by different valve operators, one of the first group and one of the second group.

10. The invention of claim 1 wherein:
a. a passage is formed in said valve body and communicates one of said inlet ports with said outlet manifold;
b. a first valve connected in said passage and manipulated by one of said first group of valve operators;
c. said valve operator manipulating a slidable seal member between two positions; and,
d. said seal member being positioned with respect to a portion of said passage that said seal member selectively seals and opens said passage to communications therethrough.

11. The invention of claim 10 wherein:
a. said valve operator is a slidable elongate member received in an opening in said valve body which intersects said passage;
b. said passage being formed in two portions offset from one another and intersecting the opening for said valve operator at spaced points along the length of said opening; and, c. said seal member sealing against said opening and being slidable to a position between the two intersections to seal communications between the offset portions of said passage.

12. The invention of claim 11 wherein said valve operator is a circular rod received within a larger circular opening in said valve body, and said seal is an encircling O-ring about said rod.

13. The invention of claim 12 further including two additional O-rings carried on said rod, each always being positioned respectively on said rod to prevent communication along said opening from said passage.

14. The invention of claim 1 wherein:
  a. said valve operator is an elongate rod having a pair of faces thereon;
  b. a passage in said valve body connected from one of said inlet ports to said outlet manifold;
  c. an opening in said valve body intersecting said passage and receiving therein said elongate rod;
  d. a first encircling seal in said valve body surrounding said passage and cooperatively contacted with said elongate rod;
  e. a second encircling seal in said valve body surrounding said passage and cooperatively contacted with said elongate rod;
  f. said first and second seals being contacted against the pair of faces of said rod; and,
  g. an opening formed in said rod from one to the other of said faces, said opening being of a size and position to communicate at both ends thereof through said pair of faces with said passage intersected by said opening but wherein the communication is controlled by said first and second seals, said rod moving said opening therein from a position to maintain communication to a position denying communication along said passage.

15. The invention of claim 14 wherein said passage intersects an additional opening and an additional valve operator is arranged thereat to function as a valve in said passage.

16. The invention of claim 1 wherein:
  a. a resilient tubing member providing integrity of communication is connected from one of said inlet ports to said outlet manifold;
  b. a first valve which operatively and selectively pinches said tubing member to close it, said valve being controlled in operation by said first group of valve operators; and,
  c. a second valve which operatively and selectively pinches said tubing member to close it, said valve being controlled in operation by said second group of valve operators.

17. The invention of claim 16 wherein said first valve is closed by rotation of a particular valve operator.

18. The invention of claim 16 wherein said first valve is closed by elongate movement of a particular valve operator.

19. The invention of claim 1 wherein:
  a. said first valve operators are arranged in a plane, and a valve is selectively and controllably connected in each of said inlet ports;
  b. said second valve operators are arranged in a second plane, and a second valve in series with the first is selectively and controllably connected to each of said inlet ports to communicate them with said outlet manifold; and,
  c. said inlet ports being arranged in a rectangular pattern given by $M \times N$ where M is the number of valve operators in the first group and N is the number of valve operators in the second group, and wherein each of the M operators is connected to N valves, and each of the N operators is connected to M valves, and wherein a particular inlet port is uniquely described by a coordinate of two dimensions, one respectively each equal to or less than M and N, and are whole numbers.

20. The invention of claim 1 including a valve connected to said outlet manifold and adapted to selectively vent said manifold.

21. A non-sequential multiplexing valve comprising:

a valve body;
an outlet manifold in said valve body;
at least four inlet ports in said valve body, all of said inlet ports being connected with said outlet manifold;
a first plurality of valves operatively arranged between said inlet ports and said outlet manifold to selectively and controllably control communication between said inlet ports and said outlet manifold;
a second plurality of valves operatively arranged to selectively and controllably control communication between said inlet ports and said outlet manifold, said first and second pluralities of valves being respectively arranged in series with respect to each of said inlet ports;
a first group of valve operators operatively connected to said first plurality of valves;
a second group of valve operators operatively connected to said second plurality of valves said first and second groups of valve operators being located in separate planes; and,
said first and second groups of operators being arranged so that a particular inlet port is uniquely communicated with said outlet manifold on manipulation of a single valve operator in said first group and a single valve operator in said second group.

22. A non-sequential multiplexing valve comprising:

a valve body;
an outlet manifold in said valve body;
at least four inlet ports in said valve body, all of said inlet ports being connected with said outlet manifold;
a first plurality of valves operatively arranged between said inlet ports and said outlet manifold to selectively and controllably control communication between said inlet ports and said outlet manifold;
a second plurality of valves operatively arranged to selectively and controllably control communication between said inlet ports and said outlet manifold, said first and second pluralities of valves being repsectively arranged in series with respect to each of said inlet ports;
a first group of valve operators operatively connected to said first plurality of valves;
a second group of valve operators operatively connected to said second plurality of valves;

said first and second groups of operators being arranged so that a particular inlet port is uniquely communicated with said outlet manifold on manipulation of a single valve operator in said first group and a single valve operator in said second group; and, said first and second groups of valves each place one valve in series with a selected inlet port, and said first and second groups of valves are non-planar.

* * * * *